No. 697,415. Patented Apr. 8, 1902.
C. D. SPATES.
LAWN MOWER.
(Application filed Dec. 27, 1901.)
(No Model.) 2 Sheets—Sheet 1.

Inventor
C. D. Spates

No. 697,415. Patented Apr. 8, 1902.
C. D. SPATES.
LAWN MOWER.
(Application filed Dec. 27, 1901.)
(No Model.) 2 Sheets—Sheet 2.

Inventor
C. D. Spates

Witnesses

By
Attorneys

UNITED STATES PATENT OFFICE.

CHARLES D. SPATES, OF ROSSWAY, CANADA, ASSIGNOR OF ONE-HALF TO S. M. DAKIN, OF CENTREVILLE, NOVA SCOTIA, CANADA.

LAWN-MOWER.

SPECIFICATION forming part of Letters Patent No. 697,415, dated April 8, 1902.

Application filed December 27, 1901. Serial No. 87,502. (No model.)

*To all whom it may concern:*

Be it known that I, CHARLES D. SPATES, a subject of the King of Great Britain, residing at Rossway, in the county of Digby and Province of Nova Scotia, Canada, have invented certain new and useful Improvements in Lawn-Mowers; and I do declare the following to be a full, clear, and exact description of the invention, such as will enable others skilled in the art to which it appertains to make and use the same.

The invention relates to lawn-mowers.

The object of the invention is to provide a lawn-mower which shall be simple of construction, durable in use, comparatively inexpensive of production, efficient action, and capable of use on side-hills, along the sides of garden-beds, and close to rocks, trees, and other obstructions, and one which may be easily and quickly adjusted to vary the depth of cut.

With this and other objects in view the invention consists of certain novel features of construction, combination, and arrangement of parts, which will be hereinafter more fully described, and particularly pointed out in the appended claims.

Figure 1:
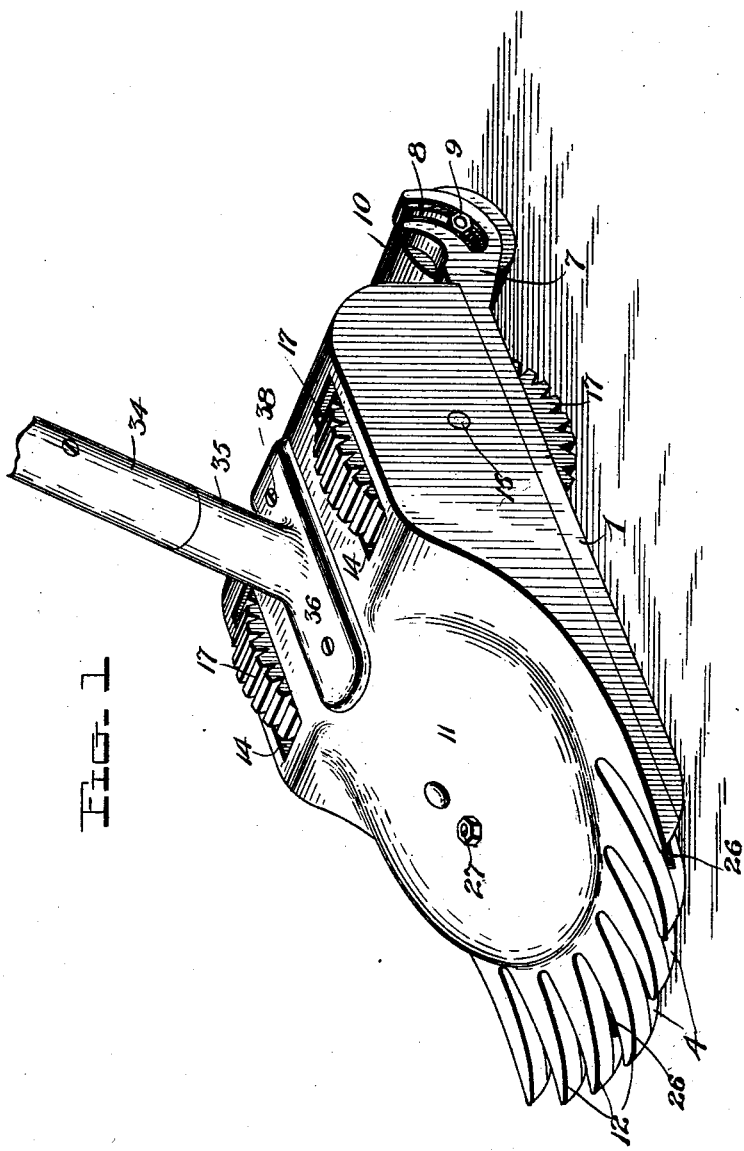
Figure 2:
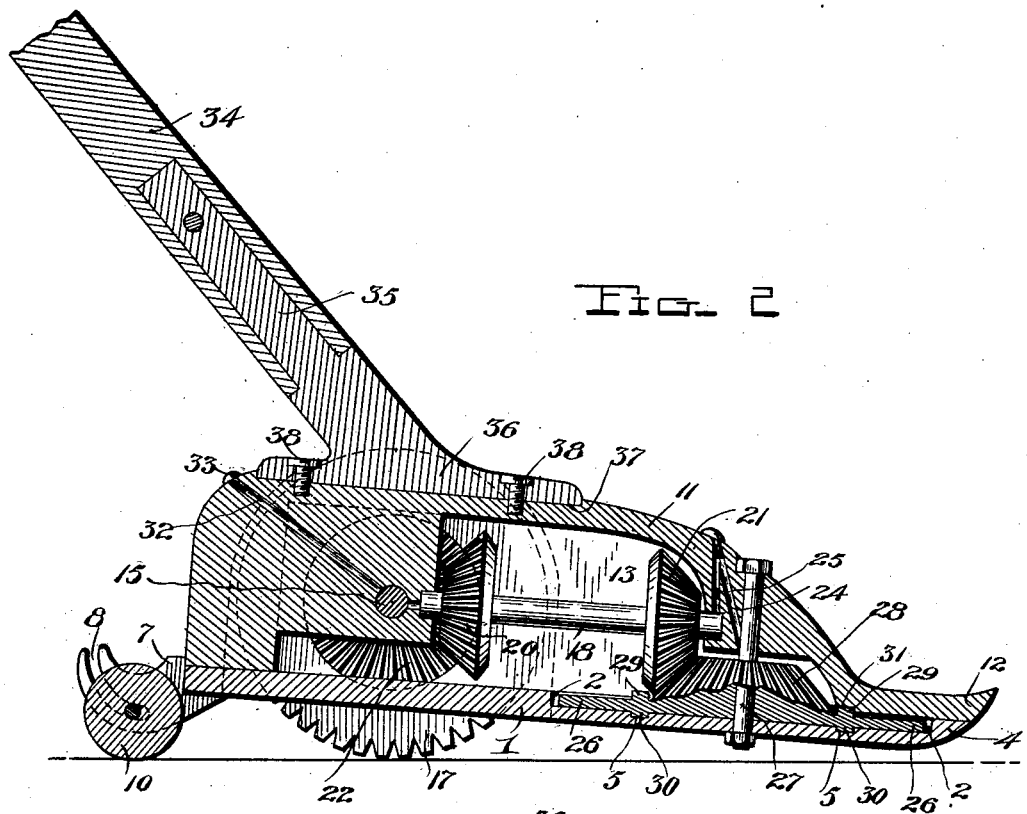
Figure 3:
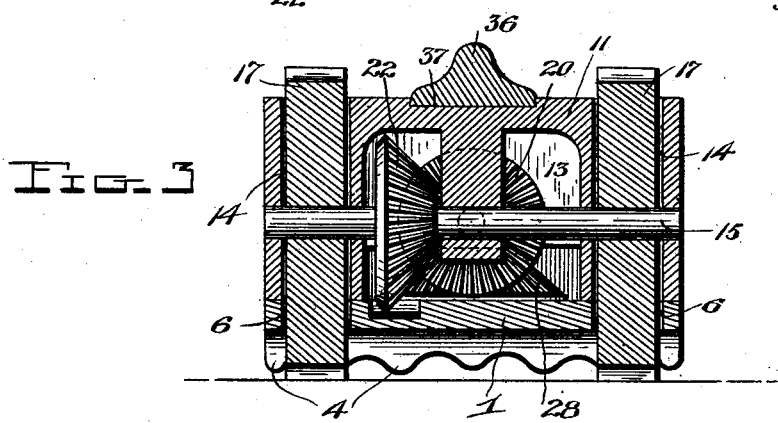

In the accompanying drawings, Figure 1 is a perspective view of my improved lawn-mower, the handle being shown broken away. Fig. 2 is a longitudinal vertical sectional view, and Fig. 3 is a vertical cross-sectional view taken on a line from the drive-shaft.

Referring to the drawings, 1 denotes the base of the mower, which consists of a casting, the forward end of which is provided with an annular recess 2 and the forward edge of which is provided with fingers to form the lower half-section of guard-fingers 4, while the central portion is provided with an annular groove 5. To the rear of this recess are formed two longitudinal slots 6 for a purpose to be hereinafter described.

7 denotes ears, which project downwardly and rearwardly from the rear end of the plate and are provided with segmental slots 8, in which is adjustably mounted, by nuts 9, the axis of a roller 10 for adjusting the inclined guard-key to vary the depth of cut of the machine.

11 denotes the cap or gear-casing, the forward end of which slopes downwardly and is formed with fingers 12, which coact with the fingers 4, and is formed with a central chamber 13 and side chambers 14.

15 denotes the drive-shaft, which extends through the sides of the gear-casing or cap and to which are fixed traction-wheels 17, which are located in the side chambers 14.

18 denotes a counter-shaft the rear ends of which are suitably journaled in the wall of the chamber 13 and which is provided with beveled gears 20 and 21, the former of which meshes with and receives motion from a beveled gear 22, fixed to the drive-shaft.

Oil-ducts 24 and 25 lead downwardly from the top of the cap or gear-casing to lubricate the bearing ends of the shafts 15 and 18.

26 denotes a rotary sickle journaled upon the shaft 27 and provided upon its upper surface with a fixed beveled gear 28, which meshes with and receives motion from the beveled gear 21. The blades of the sickle have a rotary movement between the fingers and mow the grass in the manner common to these machines. The upper and lower sides of the sickle are provided with annular ribs 29 and 30, respectively, which engage a semicircular shoulder 31, formed on one of the sides of the cap or gear-casing, and the annular groove 5, formed in the recessed portion of the base.

32 denotes an oil-duct leading to the axis of the sickle, and 33 denotes the cover for closing the said duct.

34 denotes the handle, the shank 35 of which is provided with a head 36, which fits in a groove or recess 37, formed in the top of the casing and secured in place by screws 38.

As the device is pushed along the movement of the drive-wheels will, through the intermediate gearing, be transmitted to the rotary sickle and cause the same to rotate upon its axis. This rotary movement of the sickle will cause the grass to be cut in the usual manner. Owing to the fact that the drive-wheels are arranged within the sides of the gear-casing or cap, the mower may be operated close to garden-beds, rocks, trees, fences, and other obstructions.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A lawn-mower comprising a base-plate formed with fingers, and a cap or gear-casing formed with coacting alined fingers, a drive-shaft journaled in said casing, traction-wheels mounted upon said drive-shaft and arranged within the sides of the casing, a rotary sickle journaled between said gear-casing and base-plate and adapted to rotate with its blades between the alining fingers, and an intermediate gearing connecting the drive-shaft with said rotary sickle, substantially as set forth.

2. A lawn-mower comprising a base-plate formed with a segmental row of guard-fingers and with a circular recess, and a cap or gear-casing connected to the base-plate and provided with alining guard-fingers, a drive-shaft journaled in the cap or gear-casing, traction-wheels fixed to said shaft within the sides of the casing, a rotary sickle seated in the recess of said base-plate, and a train of gearing for transmitting the movement of the drive-shaft to said rotary sickle, substantially as set forth.

3. A lawn-mower comprising a base-plate formed at its forward end with a segmental row of guard-fingers and with an annular recess having a concentric annular groove, and a cap or gear-casing secured to the base-plate, a drive-shaft journaled in said cap or gear-casing, traction-wheels fixed to said drive-shaft, a rotary sickle seated in said annular recess and having an annular rib to engage the annular groove, and an intermediate gearing for transmitting movement from the drive-shaft to the rotary sickle, substantially as set forth.

4. A lawn-mower comprising a base-plate provided with guard-fingers and having near its rear end and at its sides parallel longitudinal slots or openings, a cap or gear-casing secured to said base-plate and provided with alining guard-fingers, a transverse shaft journaled in said cap or gear-casing, traction-wheels fixed to said shaft and projecting through the longitudinal slots or openings in the base-plate, a rotary sickle, and means for transmitting movement from the drive-shaft to the rotary sickle, substantially as set forth.

5. A lawn-mower comprising a base-plate provided with guard-fingers and having near its rear end and at its sides parallel longitudinal slots or openings, a cap or gear-casing secured to said base-plate and provided with alining guard-fingers, a central chamber, side chambers, a transverse shaft journaled in the side pieces of said cap or gear-casing, a counter-shaft arranged at right angles to the transverse shaft and located within the central chamber, traction-wheels fixed to said shaft and rotating in the side chambers and projecting through the longitudinal slots or openings in the base-plate, a beveled gear fixed to said transverse shaft, beveled gears fixed to said counter-shaft, one in mesh with the aforesaid beveled gear, and a rotary sickle having a fixed beveled gear in mesh with the forward beveled gear of the counter-shaft, substantially as set forth.

In testimony whereof I have hereunto set my hand in presence of two subscribing witnesses.

CHARLES D. SPATES.

Witnesses:
GEO. B. BISHOP,
W. B. STEWART.